Feb. 18, 1930.  C. SKLAREK  1,747,739
SUPPORT FOR DIRIGIBLE SPOTLIGHTS
Filed April 12, 1928
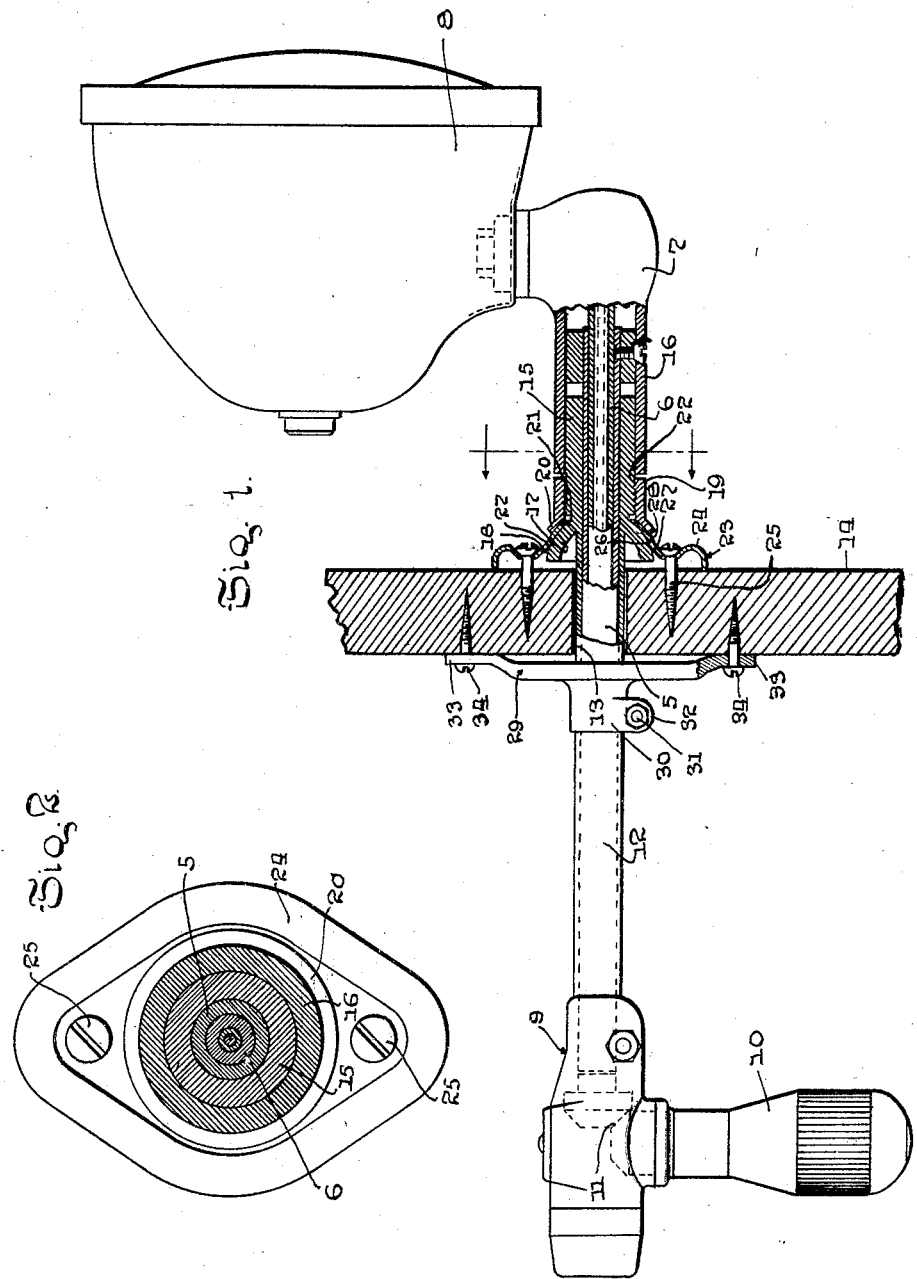
Witness
William P. Kilroy
Inventor,
Clifford Sklarek
By George I. Haight
Atty.

Patented Feb. 18, 1930

1,747,739

UNITED STATES PATENT OFFICE

CLIFFORD SKLAREK, OF CHICAGO, ILLINOIS, ASSIGNOR TO INTERNATIONAL SPOTLIGHT CORPORATION, OF CHICAGO, ILLINOIS, A CORPORATION OF ILLINOIS

SUPPORT FOR DIRIGIBLE SPOTLIGHTS

Application filed April 12, 1928. Serial No. 269,365.

This invention relates to supports for dirigible spotlights.

An object of the invention is to provide a support adapted to be secured to the windshield structure of a closed type of automobile, for supporting a spotlight, having concentric shafts extending through the windshield structure, and wherein the support is provided with means by which the shafts may be arranged at any angle desired, with reference to the windshield structure, and secured in position at the desired angle, the support including means which rotatably carry the shafts of the spotlight and support the same for their rotatable movements.

A more specific object of the invention is to provide a support of the character referred to, in which a universal mounting for the shafts is afforded, and which includes a truncated spherical member adapted to be rigidly affixed in position, in conjunction with inner and outer clamping parts having globular surfaces adapted to engage opposite sides of the wall of the spherical supporting member, and operating to maintain the shafts at the desired angle with respect to the windshield structure, one of the clamping members being detachable and the other being rigidly affixed to the tubular sleeve in which the shafts are rotatably carried.

Another object of the invention is to provide a supporting bracket adapted for co-operation with the universal mounting above referred to, and which is provided with bendable supporting arms which may be made to conform to windshield structures of different contours and to the different angles of inclination of the operating shafts of the spotlight, so as to assist in maintaining the shafts in operative position.

Other and further objects of the invention will more clearly appear from the description and claims hereinafter following.

In the drawings forming a part of this specification, Figure 1 is a vertical sectional view, taken through the end post of the windshield structure of a closed type of automobile, and showing the support utilized in connection with a dirigible spotlight. And Figure 2 is a vertical sectional view, corresponding substantially to the line 2—2 of Figure 1.

As shown in the drawings, 5 and 6 represent outer and inner concentric shafts which serve as operating means for the spotlight, and which extend through the windshield structure of the automobile. Rigidly affixed to the outer end of the outer shaft 5, is a lamp-carrying member 7, upon which is mounted the lamp head 8. At the opposite end of the shaft 5, there is rigidly affixed a handle-supporting member 9 which has an angularly disposed handle portion 10 by which the outer shaft 5 may be rotated. The handle 10 is rotatable about its individual axis and is operatively connected to the inner shaft 6 by means of gears, indicated at 11 in dotted lines. The inner shaft 6, at its forward end, is connected by suitable gears, not shown, to the lamp head 8, whereby rotation of the shaft 6 effects rotation of the lamp head upon its vertical axis. The construction here described forms no part of the present invention, except in so far as the same enters into combination with the support therefor, as hereinafter referred to, the lamp structure being similar to that disclosed in my application filed February 13, 1928, Ser. No. 253,820.

The support comprises a tubular section 12, which extends through a suitable opening 13 in the corner post 14 of a closed type of automobile. The tubular section 12 is provided at its outer end with an enlarged tubular portion 15, which projects somewhat loosely into a sleeve forming part of the rear of the lamp-carrying member 7, as indicated at 16. The tubular section 12, adjacent the meeting ends of the latter and the tubular portion 15, is provided with a clamping member 17, formed integrally with the tubular section 12 and the tubular portion 15, said clamping member 17 being provided with a globular-engaging surface 18. The tubular portion 15 has threaded thereon a clamping member 19 in the form of a collar, having a flared extension 20, provided with an inner globular-engaging surface, indicated at 21. The clamping member 19 is movable longitudinally with reference to the tubular portion 15, by reason of the provision of the threads 22 upon the clamping member and the tubular portion 15.

The clamping members 17 and 19 are adapted to co-operate with a bracket 23. The bracket 23 is preferably elongated in form, and providing with a strengthening corrugation 24 along its outer periphery, and inwardly of said corrugation is provided with openings for the passage of securing screws 25—25. Centrally, the bracket 23 is provided with an outwardly extending hollow protuberance or ball-shaped member 26, which has inner and outer spherical surfaces 27 and 28, adapted to co-operate respectively with the globular surfaces 19 and 20 of the clamping members 17 and 19, the protuberance being perforated for the passage of the tubular member therethrough.

By the construction described, it will be apparent that the tubular section 12 and tubular portion 15 may be extended through a suitable opening like that indicated at 13 in the post 14 at any desired angle, and when it is desired to adjust the tubular support with reference to the bracket, it is only necessary to loosen the clamp 19, as permitted by the threads, which enables the tubular section to be tilted with reference to the bracket 23 in any direction, after which the clamping member 19 may be screwed home so as to hold the clamping portions 17 and 19, and consequently the tubular support at any desired angle with reference to the bracket 23.

Although the universal mounting means, just described, are entirely adequate to maintain the tubular support in any of its adjusted positions, I prefer to utilize, at the inner side of the post 14, an auxiliary bracket 29. This bracket is provided with a sleeve portion 30, adapted to be clamped upon the tubular section 12 by means of a bolt 31 extending through suitable split arms 32 upon the sleeve portion 30 of the bracket. The bracket 29 is further provided with radially extending arms 33, which are formed of bendable material, so that they may be bent in any desired direction to conform to the surface with which they are to be utilized and the angle of inclination of the tubular section 12, the ends of the arms 33 being adapted to be secured to the post 14 by means of suitable screws 34.

While I have herein shown and described what I consider the preferred manner of carrying out the invention, the same is merely illustrative, and I contemplate all changes and modifications which come within the scope of the claims appended hereto.

I claim:

1. In a device of the character described, the combination with a supporting post; of a spotlight provided with a rotatable shaft extending through said post and having means adjacent its opposite ends providing abutments; a tubular element extending through said post, the opposite ends of which engage said abutments to prevent longitudinal movement of said shaft with reference to said post; a bracket mounted on one side of said post and provided with a hollow ball-shaped member having interior and exterior spherical surfaces; and relatively adjustable clamping members carried by said tubular element, one of said clamping members being disposed within the ball-shaped member and having an exterior spherical surface adapted to be clamped against the interior spherical surfaces of said ball-shaped member and the other clamping member embracing the ball-shaped member and having an interior spherical surface adapted to be clamped against the exterior surface of said ball-shaped member.

2. In a supporting means for a dirigible spotlight for vehicles, including a rotary operating shaft extending through a wall of the vehicle and a lamp structure mounted on said shaft for rotation therewith, the combination with a supporting member in which the rotatable shaft of the spotlight is mounted; of a bracket member fixed to the wall of the vehicle, said bracket member and supporting member having cooperating universal clamping means thereon for holding the supporting member in fixed position with respect to said wall, including a fixed wall portion on one of said members having interior and exterior concentric spherical surfaces, and cooperating clamping sections on said supporting member between which said wall portion is clamped, said wall portion forming a hollow globular member, one of said sections being fixed to said supporting member and the other being adjustably secured thereon for clamping movement toward the first named section, one of said sections extending into said globular member and having a spherical clamping surface engaging the interior surface of said wall portion and the other of said sections embracing the globular member and having an interior spherical clamping surface engaging the exterior surface of said wall portion.

3. In a supporting means for a dirigible spotlight for vehicles, including a rotary operating shaft extending through a wall member of the vehicle and a lamp structure mounted on the shaft for rotation therewith, the combination with tubular supporting member in which the rotatable shaft of the spotlight is mounted; of a supporting bracket fixed to one side of said wall member, said bracket having a hollow globular portion with concentric exterior and interior spherical surfaces; means forming a fixed part of said supporting member extending into said globular section, said means having an exterior spherical clamping surface engaging with and fitting the interior surface of said globular section; and a clamping member adjustably secured exteriorly to the supporting member for movement toward the other clamping surface of said supporting member and having an interior spherical surface engaging and fitting the exterior surface of said globular section.

4. In a supporting means for a dirigible spotlight for vehicles, including a rotary operating shaft extending through a wall member of said vehicle and a lamp structure mounted on said shaft and rotatable therewith, the combination with a tubular supporting member in which said shaft is rotatably mounted; of a bracket fixed to the vehicle wall, said bracket having a hollow, globular portion presenting concentric exterior and interior spherical clamping surfaces; and means for clamping the tubular supporting member to said bracket including a fixed section on said supporting member disposed within said globular section, and an adjustable clamping sleeve threaded on said supporting member and having a portion embracing said globular section, said fixed section and sleeve portion having exterior and interior spherical clamping surfaces engaging respectively said interior and exterior surfaces of said globular section.

5. In a supporting means for a dirigible spotlight for vehicles including a rotary operating shaft extending through a wall member of said vehicle and a lamp structure mounted on said shaft and rotatable therewith, the combination with a tubular supporting member in which said shaft is rotatably mounted, said supporting member extending through said vehicle wall; of brackets fixed to opposite sides of said wall, said tubular supporting member extending through both brackets; and universal clamping means for fixedly securing the support to one of said brackets, including a hollow, globular clamping section on the bracket, having concentric interior and exterior spherical clamping surfaces, and a pair of relatively adjustable clamping members on said support, one of which engages within said globular section and has a spherical surface engaging said interior surface, and the other of which embraces said globular section and has an interior spherical surface engaging the exterior surface of said globular section.

6. In a supporting means for a dirigible spotlight for vehicles including a rotary operating shaft extending through a wall member of said vehicle and a lamp structure mounted on said shaft and rotatable therewith, the combination with a tubular supporting member in which said shaft is rotatably mounted, said supporting member extending through said vehicle wall; of a bracket member secured to one side of said wall; means for fixedly clamping the tubular member to said bracket member, including a hollow, globular section on one of said members having interior and exterior concentric clamping surfaces, and cooperating relatively adjustable clamping sections on the other member having exterior and interior clamping surfaces respectively engaging the interior and exterior surface of said globular section; and a second bracket on the other side of said wall, to which said tubular supporting member is clamped, said last named bracket having bendable arms by which it is secured to the vehicle wall.

In witness that I claim the foregoing I have hereunto subscribed my name this 10th day of April, 1928.

CLIFFORD SKLAREK.